United States Patent

[11] 3,599,187

[72] Inventors Andrew H. Bobeck
Chatham;
Iryne Danylchuk, Morristown; Umberto F. Gianola, Florham Park, all of, N.J.
[21] Appl No. 235,612
[22] Filed Nov. 6, 1962
[45] Patented Aug. 10, 1971
[73] Assignee Bell Telephone Laboratories, Incorporated New York, N.Y.

[54] MAGNETIC MEMORY CIRCUITS
44 Claims, 16 Drawing Figs.

[52] U.S. Cl. .......... 340/174 CH, 340/174 M, 340/174 TF, 340/174 CT
[51] Int. Cl. .......... G11c 11/14, G11c 11/08, G11c 7/00
[50] Field of Search .......... 340/174 CT, 174 M, 174 TF

[56] References Cited
UNITED STATES PATENTS

| | | | |
|---|---|---|---|
| 3,004,243 | 10/1961 | Rossing | 340/174 |
| 3,148,358 | 9/1964 | Snyder | 340/174 |
| 3,142,825 | 7/1964 | Shever | 340/174 |
| 3,160,864 | 12/1964 | Shever | 340/174 |
| 3,192,512 | 6/1965 | Korkowski | 340/174 |
| 3,300,767 | 1/1967 | Davis et al | 340/174 |

*Primary Examiner*—Stanley M. Urynowicz, Jr.
*Attorneys*—R. J. Guenther and Kenneth B. Hamlin

ABSTRACT: An elongated electrical conductor having parallel branch conducting paths wherein portions of the conductor comprising the branch conducting paths are made of magnetic material having rectangular hysteresis characteristics. A closed magnetic flux is induced around the branch conducting paths by applying a write current pulse to one end of the conductor coincidentally with a write current pulse applied to a write conductor which threads the aperture formed by the branch conducting paths.

A. H. BOBECK
I. DANYCHUK
U. F. GIANOLA
INVENTORS

BY William H. Kamstra

ATTORNEY

MAGNETIC MEMORY CIRCUITS

This invention relates to magnetic memory circuits and devices, and particularly to such devices adapted to store information in the form of stable magnetic states induced in two-state magnetic elements.

Magnetic memory devices adapted for the storage of binary information in the form of representative stable magnetic states are well known in the information handling and processing art. Toroidal cores, magnetic memory wires, and magnetic films, to name a few, have been extensively employed to realize a wide range of circuits which exploit their memory capacity. This invention is concerned particularly, although not exclusively, with such memory devices organized in coordinate arrays adapted for the storage of very large numbers of binary bits. Magnetic wire memory elements arranged in coordinate arrays have proven highly useful in achieving large capacity memories which at the same time have the advantage of compactness and ease of fabrication. Two such wire memory elements are described, for example, in the copending application Ser. No. 675,522 of A. H. Bobeck, filed Aug. 1, 1957, now U.S. Pat. No. 3,083,353, issued Mar. 26, 1963, and in the copending application, Ser. No. 690,478, to U. F. Gianola, filed Oct. 16, 1957 now U.S. Pat. 3,069,661, issued Dec. 18, 1962.

In magnetic wire memory elements generally binary information is stored in the form of remanent magnetizations in discrete bit address segments of a continuous flux path coaxially associated with the memory wire. In prior art toroidal core elements flux closure is substantially entirely within the toroid itself; in most wire memory elements such as the element described in the foregoing copending Bobeck application, for example, the flux closure is through an air path between the limits of the discrete magnetized segments. The information address segments are separated by buffer regions to insure discontinuity between magnetizations in adjacent address segments. When an information address segment is magnetized in one direction to store a binary bit, a self-demagnetizing field is produced which adversely affects the magnetic stability of the address segment. In addition, because of their proximity, the fields of adjacent address segments defined on the same memory wire tend to have demagnetizing effects on the adjacent magnetizations and also on the magnetizations in corresponding address segments defined on adjacent wire memory elements. To insure the stability of information representative magnetic states in the address segments, it is necessary to maintain the lengths of the bit address segments at least as long as a predetermined minimum dimension as determined by such considerations as the particular ferromagnetic material employed, the lengths of the drive windings, the drive fields, and the spacing between drive windings, for example. The length of the buffer regions between bit address segments may also be adjusted to achieve minimum interaction between adjacent magnetizations.

The necessity of maintaining a minimum dimension for the bit address segment lengths and for the buffer spacing between the address segments as well as the necessity of maintaining a minimum spacing between corresponding address segments of adjacent memory wires obviously imposes a limit on the extent to which such a magnetic memory may be reduced in size. Conversely, a limitation is imposed on the storage capacity of a memory of given dimensions employing magnetic wire memory elements.

Accordingly, an object of the present invention is to provide a new and novel magnetic information storage element the employment of which will substantially reduce the physical size of a magnetic memory.

Another object of this invention is to increase the storage capacity of magnetic memory arrangements.

Still another object of this invention is to provide a new and improved magnetic memory element which is adapted to fabrication in a number of physical modes.

A further object of this invention is to achieve a new and improved magnetic memory array having the advantage of substantially reduced size and increased storage capacity.

It is also an object of this invention to provide new and novel magnetic film memory apparatus.

The foregoing objects of this invention are realized in one specific embodiment thereof comprising an elongated electrical conductor doubly bifurcated to form a pair of parallel branch conducting paths connected in series between the ends of the conductor. At least the portion of the conductor comprising the branch conducting paths is constructed of a magnetic material having substantially rectangular hysteresis characteristics such that a closed magnetic flux may be induced around the branch conducting paths in the conductor. In the operation of the element so far generally described a write current pulse is applied to one end of the conductor coincidentally with a write current pulse applied to a write conductor threading the aperture formed by the branch conducting paths of the memory element. The resultant magnetomotive forces generated by the coincident current pulses thus applied induce, around the closed flux loop formed by the branch conducting paths, a helical magnetization the direction of which is determined by the polarities of the coincident write current pulses. The helical magnetization of a particular direction will result if the magnetic material comprising the branch conducting paths is isotropic and therefore has no easy direction of magnetization.

The material comprising the branch conducting paths may on the other hand have a uniaxial anisotropy induced therein. In this case, the resultant magnetomotive forces generated by the coincident write current pulses will induce, around the branch conducting paths, a circular magnetization the direction of which again will be determined by the polarities of the coincident write current pulses. In accordance with the conventional representation of binary values in magnetic elements generally, the directions of the helical or circularly induced fluxes around the closed flux path in the branches of the conductor will indicate whether a binary "1" or a binary "0" is stored in the element. Which of these values is written into the element will be determined by the access circuitry controlling the polarities of the coincident write current pulses.

During a subsequent readout phase, a read current pulse is applied to one end of the conductor element alone. When this read current pulse is applied to the actual information storage portion of the conductor, that is, the closed flux path presented by the branch conducting paths, the read current divides equally in the pair of branches. As a result, circular magnetic fields are generated around each of the branch portions of the conductor. These fields alter the remanent magnetization, whether helical or circular, to a direction which is orthogonal to the axes of the branch portions of the conductor. The flux switching thus caused is detected as a voltage induced in a sense conductor also threading the aperture formed by the branch conducting paths in the memory element. The polarity of the output voltage thus induced, which polarity will be determined by the direction of the readout flux switching, will be indicative in the conventional manner of the binary value which had been stored in the memory element.

It will be apparent that in a memory element according to this invention air closure of flux is reduced to a minimum. While the memory element is storing an information bit, the information representative flux is closed, in the case either of an isotropic or anisotropic material, entirely within the closed flux loop provided by the branch conducting paths of the conductor element. The effects of magnetic fields of adjacent address elements, when such an arrangement as generally described in the foregoing is extended to large coordinate arrays, will also advantageously be maintained at a minimum. As a result, individual address elements may be arranged closer together than was heretofore possible. At the same time that the foregoing advantages are achieved, the advantage offered by a magnetic wire memory element in its ability to have drive current pulses applied directly thereto is retained.

Advantageously, when an anisotropic magnetic material is employed for the memory element according to this invention, readout may be nondestructive. The read current pulse may be so adjusted with respect to its amplitude that upon its termination, the magnetization representative of the stored information bit returns to its originally induced direction without the expenditure of additional power in an added restore phase of operation. The memory element also lends itself advantageously to other forms than the one briefly described in the foregoing. Thus, for example, as will be described in further detail hereinafter, a memory element according to this invention may readily be achieved by plating or otherwise depositing a magnetic film on or completely around an electrical conductor on the portion thereof comprising the information storage address. The memory element may also take the form of a flat electrically conducting strip of a square loop magnetic material, which strip has a plurality of apertures provided therein to constitute the branch conducting paths for a plurality of information addresses. Other configurations are also possible in accordance with the principles of this invention.

In summary, one of the features of this invention is thus an electrically conductive magnetic structure in which a pair of branch conducting paths are provided. A current pulse applied directly to the structure itself, divides at the branch paths and the fields generated thereby in conjunction with fields generated by a current pulse simultaneously applied to a conductor threading the aperture in the magnetic structure formed by the branch conducting paths, induces a helical or circular magnetization in the structure around the branch conducting paths. The direction of the magnetization is determined by the isotropic or anisotropic character of the magnetic material from which the magnetic structure is fabricated.

It is another feature of this invention that a read pulse applied exclusively to the magnetic structure generally described in the immediately foregoing causes a flux switching around the flux path defined by the branch conducting paths from a substantially circular direction therearound in a plane which is orthogonal to the axes of the branch conducting paths and circumferential around the branch paths.

The foregoing and other objects and features of this invention will be better understood from a consideration of the detailed description of specific illustrative embodiments thereof which follow when taken in conjunction with the accompanying drawing in which.

Figure 1:
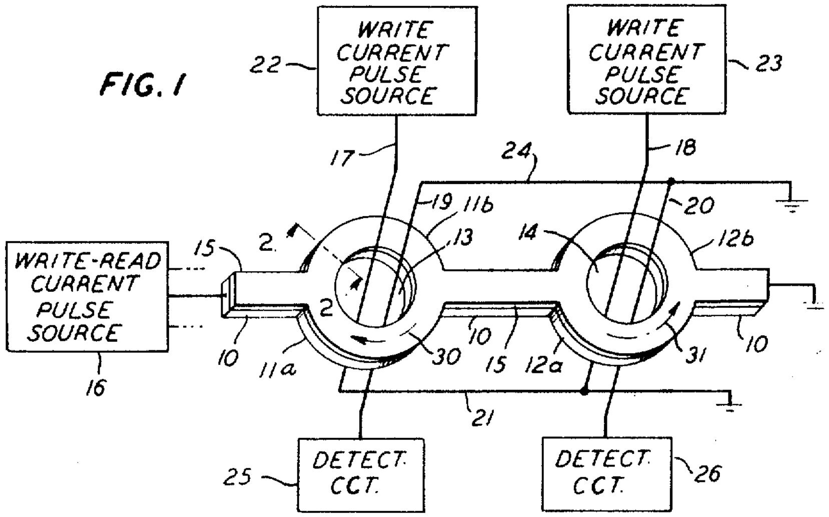
FIG. 1 depicts a simple illustrative two bit address memory element according to the principles of this invention.
Figure 2:
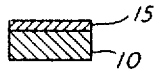
FIG. 2 shows a cross-sectional view of the structure of the memory element of FIG. 1 taken along the line 2–2 thereof.

One specific illustrative memory element according to the principles of this invention is depicted in FIG. 1 and comprises an electrical conductor 10 which in this embodiment may conveniently be formed of a flat copper strip. The conductor 10 is bifurcated at four points between its ends to form two pairs of branch conducting paths 11*a*—11*b* and 12*a*—12*b* which form in turn a pair of apertures 13 and 14, respectively. The entire surface of only one side of the conductor 10 in this embodiment is plated or has otherwise affixed thereto a magnetic layer or film 15 of a material having substantially rectangular hysteresis characteristics. FIG. 2 shows with somewhat greater clarity the relationship between the conductor 10 and the magnetic film 15 in a cross-sectional view taken along the line 2–2 of FIG. 1. In the embodiment of FIG. 1 the magnetic film 15 has a circular anisotropy induced therein around the apertures 13 and 14 in a conventional manner, as for example, by heat treatment in the presence of circular fields produced by passing a current through conductors threading the apertures 13 and 14.

One end of the conductor 10 is connected to ground and the other end is connected to a write-read current pulse source 16. The source 16 may comprise any current pulse generator of the character well known in the art capable of providing current pulses of an amplitude and polarity to be described in detail hereinafter. The apertures 13 and 14 of the conductor 10 have threaded therethrough bit write conductors 17 and 18 and sensing conductors 19 and 20, respectively. The write conductors 17 and 18 are each connected at one end to a ground bus 21 and at the other end to individual write current pulse sources 22 and 23, respectively. The latter sources may also comprise circuitry well known in the art capable of providing current pulses of the character and at times to be described. The sensing conductors 19 and 20 are each also connected at one end to ground at a ground bus 24. At the other ends the sensing conductors 19 and 20 are connected to output detecting circuits 25 and 26, respectively, which circuits are capable of detecting the output signals generated during a readout operation of this invention.

An illustrative cycle of operation of the embodiment of FIG. 1 may now be described. For this purpose, it will be assumed that a binary "1" is to be stored in the information address defined by the branch conducting paths 11*a*—11*b* around the aperture 13 and a binary "0" is to be stored in the information address defined by the branch conducting paths 12*a*—12*b* around the aperture 14. The embodiment of FIG. 1 may be understood as being word organized, that is, the binary bits to be stored in the information addresses around the apertures 13 and 14 of the memory element are the characters of the binary word defined along the conductor 10. This organization of the simple illustrative arrangement of FIG. 1 is assumed in view of the conventional employment of memory elements according to this invention in larger coordinate arrays so organized. Such larger array is schematically indicated by multiple output leads in source 16 in FIG. 1 extending to plural word storage members, now shown, of the same type as the laminated member 10, 15 that is shown, and with corresponding apertures linked by the illustrated sensing and bit drive circuits. Source 16 is adapted as is known in the art to drive only a selected one of its outputs at a time. Similar array arrangements are of course useful, and to be understood, in regard to another embodiments illustrated herein.

In order to introduce the exemplary binary bits into the memory element FIG. 1 during a write phase of operation, the write-read current pulse source 16 and the write current pulse sources 22 and 23 are coincidentally controlled to apply write current pulses to the conductor 10 and the write conductors 17 and 18. The character of the write pulses and their timing are shown in the pulse diagram of FIG. 3, the pulses being depicted in idealized form. During write-in the write-read current pulse source 16 is controlled to apply a positive current pulse 27 to the conductor 10. In an overlapping time relationship with the latter pulse, the write current pulse sources 22 and 23 are controlled to apply positive and negative current pulses 28 and 29 to the write conductors 17 and 18, respectively. The sources 16, 22, and 23 are controlled for coincident operation and the latter two sources are selectively controlled for polarity of output signals by circuitry, now shown nor comprising a part of the present invention, associated with the information handling system of which the embodiment of FIG. 1 may advantageously comprise a part.

Figure 3:
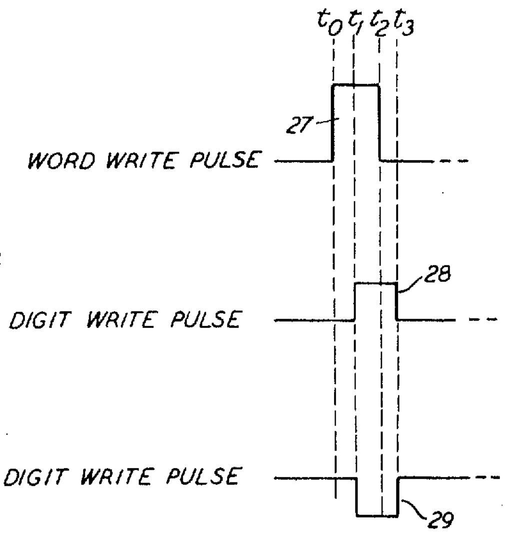
FIG. 3 is a diagram charting the time relationships of current pulses applied in connection with illustrative operations of the embodiment of FIG. 1.
Figure 4:
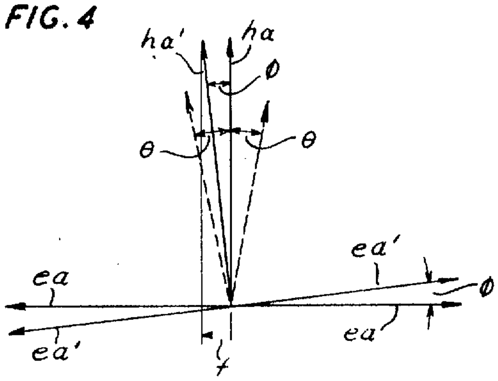
FIG. 4 is a vector diagram illustrating particular flux orientations during operative phases of the embodiment of FIG. 1.

The cooperation of the write pulse pairs 27—28 and 27—29 may best be understood when described with reference to the pulse chart of FIG. 3 and the diagram of FIG. 4 which depicts schematically the relationship of the axes of magnetization of the memory element of FIG. 1 and the drive fields applied during operative stages of the memory element. In FIG. 4 the line *ea* represents the ideal easy axis of magnetization of the bit address portions of the memory element of FIG. 1 resulting from the circular anisotropy mentioned hereinbefore as being established in the memory element. If the magnetic material of the film 15 were ideal, an ideal anisotropy as represented by the line *ea* could also be established in the film. However, in practice it has been found that such an ideal anisotropy is never realized due to imperfections in the magnetic material. As a result, easy axis dispersion caused by local deviations from the ideal anisotropy causes the actual or true easy axis of magnetization to lie at a skew angle from the ideal axis. This true easy axis is represented in FIG. 4 by the line *ea'*, the skew angle being designated Φ. The word write pulse 27, which may be assumed as being applied at the time $T_0$ during the write phase of operation, generates a magnetic field which is at every point orthogonal to the ideal easy axis of magnetization *ea* of the memory element conducting branch paths. Since the write pulse 27 divides at the nodes of the branch paths 11*a*—11*b* and 12*a*—12*b*, the fields generated thereby will be operative in the same directions with respect to the individual paths of the branch path pairs. The latter fields will in each case, however, be in the ideal hard direction of magnetization of the film 15, that is, 90° from the ideal easy axis of magnetization. The write fields generated by the write pulse 27 will accordingly cause a rotation of the magnetization in the film 15 in the ideal hard direction as represented by the line *ha* in the diagram of FIG. 4. It should be noted, however, that this rotation represented by the line *ha* is at the complement of the skew angle Φ from the actual or true easy axis of magnetization represented by the line *ea'*. The actual or true hard axis of magnetization due to axis dispersion is orthogonal to the true easy axis and is represented in FIG. 4 by the line *ha'*.

It may be noted that no upper limit is imposed on the amplitude of the pulse 27. Since once the magnetization has been rotated to the ideal hard directions, no further flux change except a further drive into saturation can result no matter how much the amplitude of the pulse 27 is increased. A lower amplitude limit of the pulse 27 is established only as being sufficient to cause a complete rotation of the magnetization to the ideal hard direction. The drive field generated by the pulse 27 must thus be greater than the anisotropy field and any added magnetostatic fields present due to air closure of the switching flux. The pulse 27 may also be of either polarity since it is irrelevant in which direction from the true easy axis of magnetization rotation takes place. For purposes of illustration only, a positive polarity is chosen for the pulse 27.

Were the write pulse 27 terminated at this time without the application of the cooperating write pulses 28 and 29, the magnetizations of the bit addresses would automatically rotate back toward the true easy axis of magnetization. The direction of rotation in every such case would be determined by the least angular distance to be traversed for restoration to the true easy axis. In order to complete the write operation and selectively tip the magnetizations into the desired directions along the easy axis of magnetization in accordance with the binary bits to be introduced into the memory element of FIG. 1, the positive and negative digit write current pulses 28 and 29 are applied to the write conductors 17 and 18, respectively. The latter pulses provide only for the selective tipping of the magnetizations rotated out of the true easy axis of magnetization by the write pulse 27. Accordingly, the write pulses 28 and 29 are applied at the time $t_1$ which is determined as being sometime after the time $t_0$ at which the pulse 27 is applied and before the time $t_2$ at which the pulse 27 is terminated. The pulses 28 and 29 are terminated at the time $t_3$ which latter time is determined as being after the time $t_2$ at which the pulse 27 is terminated. These time relationship are depicted in the pulse chart of FIG. 3.

If, as discussed in the foregoing, the material of the magnetic film 15 were ideal and as a result a perfect easy axis of magnetization were established therein, the lower amplitude limits of the pulses 28 and 29 would approach zero since only a very small drive would be necessary to tip the rotated magnetization in either direction along the perfect easy axis. However, since such an ideal anisotropy is not realized, the fields generated by the pulses 28 and 29 and accordingly the pulses themselves need only be large enough to overcome any easy axis dispersion or skew. Specifically, the field generated by the one of the pulses 28 or 29 which is to tip the magnetization of the bit address through the greatest angle of rotation must be sufficient to rotate the magnetization from the ideal hard axis past the true hard axis resulting from the axis dispersion. This field is represented in the diagram of FIG. 4 by the arrow *f*. The field in the opposite direction generated by the other of the pulses 28 or 29 is maintained equal to the latter field since the particular axis dispersion of the film 15 may not be uniform either in direction or in magnitude. Thus, in the case of the dispersion depicted in FIG. 4, it is clear that a field in the opposite direction would not be needed since a rotation of the magnetization from the ideal hard axis represented by the line *ha* back to the true easy axis *ea'* would follow automatically. This suggests an alternate mode of operation, for example, in which one of the digit write pulses is eliminated by introducing an artificial skew in the magnetic film 15. With the lower limit for the amplitude of the digit write pulses 28 and 29 thus established, the upper limit of the amplitude for these pulses is determined as being less than the disturb threshold of the magnetic film 15 measured along the easy axis of magnetization. Since the memory element of FIG. 1 is contemplated as being employed in a memory array, the maintenance of this upper limit insures that information stored in corresponding bit addresses of memory elements also coupled to the digit write conductors 17 and 18 is not disturbed. As described in the foregoing, the overlapping application of the pulse pairs 27—28 and 27—29 thus induces, during the write phase, magnetizations around the apertures 13 and 14 in the clockwise and counterclockwise directions, respectively, as indicated by the broken line arrows 30 and 31 in FIG. 1.

Information stored in the memory element of FIG. 1 is read out during a subsequent readout phase by the application of a read pulse by the pulse source 16 to the conductor 10. The latter pulse may also be of either polarity although a positive such pulse is assumed for purposes of illustration. Advantageously, read out in the embodiment of FIG. 1 may be either destructive or nondestructive. For destructive readout the read pulse is sufficient to rotate the magnetizations around the apertures 13 and 14 to the ideal hard axis of magnetization as represented by the line *ha* in FIG. 4. Thus, destructive readout may be accomplished in the embodiment of FIG. 1 by a reapplication of the pulse 27 by the source 16 during the readout phase. The direction of rotation of the magnetizations will obviously depend on the particular binary bits stored in the bit addresses around the apertures 13 and 14. The flux changes around the latter apertures caused by the read pulse induce voltage readout signals in the sensing conductors 19 and 20. The polarities of the readout signals follow from the direction of magnetization rotation and these signals are transmitted to the detection circuits 25 and 26 as indicative of the binary values readout.

In the foregoing destructive readout operation, it will be recalled that the magnetic rotation was short of a full 90° from the actual or true easy axis of magnetization by the amount of the angle of the axis dispersion. Thus, as is evident from the diagram of FIG. 4, during a readout rotation, the magnetizations in the bit addresses of the memory element of FIG. 1 reach only the ideal hard axis of magnetization which is less than 90° from the true easy axis. This follows since no matter what the skew angle, the field generated by a read pulse (or the pulse 27) is always in a direction orthogonal to the ideal easy axis of magnetization of the film 15. If the rotation had been to the true hard axis as represented by the line *ha'* in FIG. 4, at the termination of the read pulse, the rotational restoration of the magnetizations in the film 15 to the true easy axis would be wholly random. As a result, the information representation magnetic states of the bit addresses would be effectively destroyed. However, since the magnetic rotation during destructive readout as described in the foregoing is less than 90°, the rotational restoration of the magnetizations would, for each bit address without regard to the bit stored therein, be in the same direction, that is, in the direction toward the true easy axis in which the rotated magnetizations are already tipped. It is thus clear, that in this case also, the magnetic state for at least one of the binary bits is always destroyed during readout.

From the foregoing, it is evident that nondestructive readout may be achieved in the memory element of FIG. 1 by insuring that after the readout rotation of the magnetizations in the bit addresses has been completed, the magnetizations restore to the particular directions along the true easy axis of rotation representative of the binary bits to be retained in the memory element. This may be accomplished by limiting the amplitude of the read pulse so that its field rotates the magnetizations in the bit addresses by an angular distance equal to or less than the complement of the easy axis dispersion angle. Thus, as is evident from the diagram of FIG. 4, if the read drive field is limited so that the magnetic rotation is less than the ideal hard axis of magnetization by an angular amount which is greater than the easy axis dispersion, or skew angle, which amount is designated as the angle $\theta$ in FIG. 4, the magnetizations of the bit addresses will restore to their particular information representative states after readout without the application of a subsequent rewrite operation. This is clear, since for each binary bit, the angle of rotation for restoration to the corresponding magnetic states for each direction along the easy axis is less than 90°.

The embodiment of this invention depicted in FIG. 1 was described in the foregoing as comprising a laminate of a conductor 10 and a magnetic film 15, a section of which is shown in FIG. 2. It is to be understood, however, that this construction is only one convenient manner of realizing a memory element according to this invention and this invention is not limited to a laminate construction. Thus, as mentioned previously, the entire memory element of FIG. 1 may also be fabricated of a single e structure of an electrically conductive magnetic material having substantially rectangular characteristics. The magnetic film 15 of the embodiment of FIG. 1 may thus, for example, also be electrically conductive in which case the word write and read pulses are applied directly to the magnetic film 15 itself rather than to its associated conductor 10 which in such a construction would be eliminated. A memory element thus constructed operates in a substantially similar manner to that described for the laminate construction specifically depicted in FIG. 1.

Figures 5, 6:
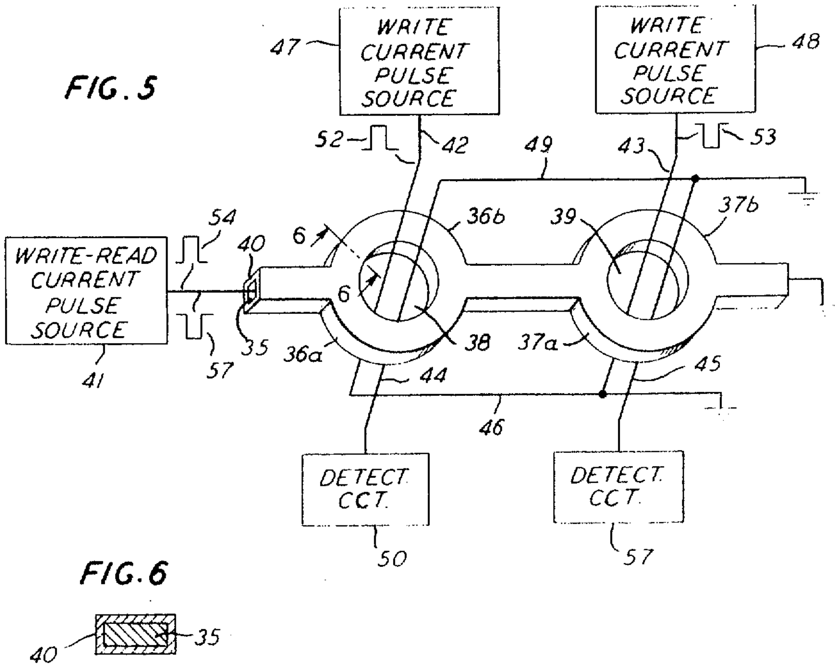
FIG. 5 depicts another illustrative two bit address memory element according to this invention.
FIG. 6 shows a cross-sectional view of the structure of the memory element of FIG. 5 taken along the line 6–6 thereof.

Another memory element according to the principles of this invention depicted in FIG. 5 comprises an electrical conductor 35 which may again conveniently be formed of a flat copper strip. The conductor 35 is also bifurcated at four points between its ends to form two pairs of branch conducting paths 36*a*—36*b* and 37*a*—38*b* which form in turn a pair of apertures 38 and 39, respectively. All of the surfaces of the conductor 35 are plated or have otherwise affixed thereto a magnetic layer or film 40 of a material having substantially rectangular hysteresis characteristics. A cross-sectional view of the memory element of FIG. 5 taken along the lines 6—6 is shown in FIG. 6 and illustrates with greater clarity the relationship of the conductor 35 and magnetic film 40. In the embodiment of FIG. 5 the magnetic film is isotropic with the result that the magnetizations induced in the memory element bit addresses will be in directions as determined by the resultants of the applied drive fields rather than as partly determined by the anisotropy of the magnetic material as was the case in the embodiment of FIG. 1.

One end of the conductor 35 is connected to ground and the other end is connected to a write-read current pulse generator of a character well known in the art capable of providing current pulses of an amplitude and polarity to be considered hereinafter. The apertures 38 and 39 of the conductor and film memory element have threaded therethrough bit write conductors 42 and 43 and sensing conductors 44 and 45, respectively. The write conductors 42 and 43 are each connected at one end to a ground bus 46 and at the other end to individual write current pulse sources 47 and 48, respectively. The latter sources may also comprise circuitry well known in the art capable of providing current pulses of the character and at times to be considered. The sensing conductors 44 and 45 are each also connected at one end to ground at a ground bus 49. AT the other ends the sensing conductors 44 and 45 are connected to output detecting circuits 50 and 51, respectively, which circuits are capable of detecting the output signals generated during a readout operation of the memory device.

In describing an illustrative cycle of operation of the embodiment of FIG. 5, it will be assumed that, as the result of the application of a negative read current pulse to the conductor 35 during a previous readout operation, remanent magnetizations exist in the bit address portions of the magnetic layer or film 40 around the apertures 38 and 39. As a result of the negative read pulse, these magnetizations will be in a plane orthogonal in one direction to the axis of the branching portions of the memory element around the apertures 38 and 39. The application of the read current pulse to the conductor 35 will be considered in greater detail hereinafter in connection with an illustrative readout operation of the memory element of FIG. 5. In order to write binary information into the address portions of the latter memory element, word and digit write pulses are coincidentally applied to the conductor 35 and write conductors 42 and 43 to switch the foregoing magnetizations in the directions representative of the binary bits to be stored in the memory element. For purposes of illustration it will again be assumed that a binary "1" is to be stored in the bit address around the aperture 38 and a binary "0" is to be stored in the bit address around the aperture 39. These binary bits are introduced into the memory element by simultaneously applying a positive digit write current pulse 52 to the write conductor 42 and a negative digit write current pulse 53 to the write conductor 43. These pulses are applied by the sources 47 and 48, respectively, which sources are controlled by circuitry, not shown or comprising a part of this invention, which is associated with the information handling system with which the element of FIG. 5 may advantageously be adapted for use.

Figure 7:
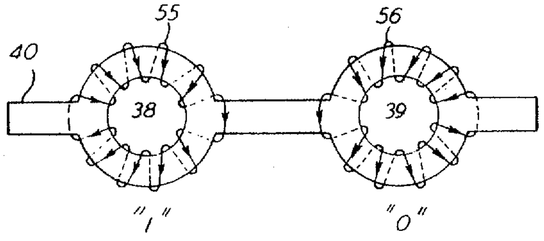
FIG. 7 depicts a portion of the memory element of FIG. 5 having flux orientations represented thereon during particular operative phases.

Simultaneously with the application of the digit write current pulses 52 and 53, a positive word write current pulse 54 is applied by the write-read current pulse source 41 to the conductor 35. The latter source is also controlled and timed by the external circuitry, not shown in the drawing, mentioned in the foregoing. The amplitude of the word write pulse 54 may exceed the switching threshold of the magnetic film 40 sufficiently to cause a complete flux reversal of the orthogonal magnetizations mentioned in the foregoing. The amplitudes of the digit write pulses 52 and 53, on the other hand, are maintained such that the magnetomotive drives generated thereby do not exceed this switching threshold. As a result, with the word current pulse 54 providing a sufficient magnetomotive force to switch the magnetizations in the bit addresses and the digit write current pulses 52 and 53 providing magnetomotive forces in opposite directions which are at 90° to the word drive, flux orientations will be induced around the apertures 38 and 39 which are helical around the axes of the bit address portions of the memory element. Since the circular drives applied by the conductors 42 and 43 are in opposite directions the helical flux orientations will also be in the opposite senses. These flux orientations will be more clearly understood from an inspection of FIG. 7, where, for the bit addresses around the apertures 38 and 39, the flux orientations are represented as the lines 55 and 56, respectively. Although the latter lines are depicted as being external to the memory element for purposes of clarity, it is to be understood that the helical flux orientations in fact exist around the conductor 35 within the magnetic film 40. The representative flux lines 55 and 56 of FIG. 7 are clearly consistent with the directions of the coincident magnetomotive forces applied by the coincident write pulse pairs 54—52 and 54—53. Thus, assuming that FIG. 7 depicts in plan view the upper surface of the conductor-film memory element of FIG. 5, the directions of the magnetizations in each branch of each bit address are substantially downward as viewed in the drawing. These directions accord fully with the positive polarity of the word write pulse 54 applied to the conductor 35 by the pulse source 41. The senses of the helical magnetization around the apertures 38 and 39 are also in accord with the polarities of the digit write pulses 52 and 53 applied to the write conductors 42 and 43 threading these apertures. The resultant of the positive word pulse 54 and the positive digit pulse 52 induces a right hand helical magnetization in the bit address around the aperture 38. This magnetization is then representative of a binary "1." On the other hand, the resultant of the positive word pulse 54 and the negative digit pulse 53 induces a left hand helical magnetization in the bit address around the aperture 39. The latter magnetization is representative of a binary "0."

The information thus introduced into the two address memory element of FIG. 5 may be read out in a subsequent readout phase of operation by the application of a negative readout pulse 54 to the conductor 35 as mentioned previously. The pulse 54 is supplied by the write-read current pulse source 51, which source is again controlled by the external circuitry, not shown or comprising a part of this invention, referred to in the foregoing. The pulse 54 applied alone during readout will have the effect of switching the helical magnetizations in both bit addresses again to a direction orthogonal to the axis of the branching portions of the bit addresses around the apertures 38 and 39. It will be appreciated that the magnetizations of the two bit addresses are switched in opposite directions to reach this orthogonal state. Thus, each bit address will switch in the direction presenting the least reluctance to the switching flux. Since, as is apparent from FIG. 7, the reversion of the magnetizations around the apertures 38 and 39 to the read magnetic state will be in opposite directions, thereby reducing in each case the circular flux components to zero, output voltage signals of opposite directions will be induced in the sensing conductors 44 and 45. These output signals, indicative of the binary bits stored in the two addresses, are transmitted to the detection circuit 50 and 51, respectively, for utilization by the system of which the memory element of FIG. 5 may comprise a part. This readout is destructive and if the information read out is to be retained, it is restored in a subsequent operation as is well known in the art.

Although the embodiment of this invention depicted in FIG. 5 was described as also being of a laminate construction, it is to be understood that this memory element may also comprise a single structure. Thus, the electrical conductor 35 could itself be of a magnetic material having substantially rectangular hysteresis characteristics, in which case the addition of the magnetic layer or film 40 surrounding the conductor 35 would be eliminated. The write and read operations in such a case are substantially similar to those operations described in connection with the embodiment of FIG. 5.

Figure 8:
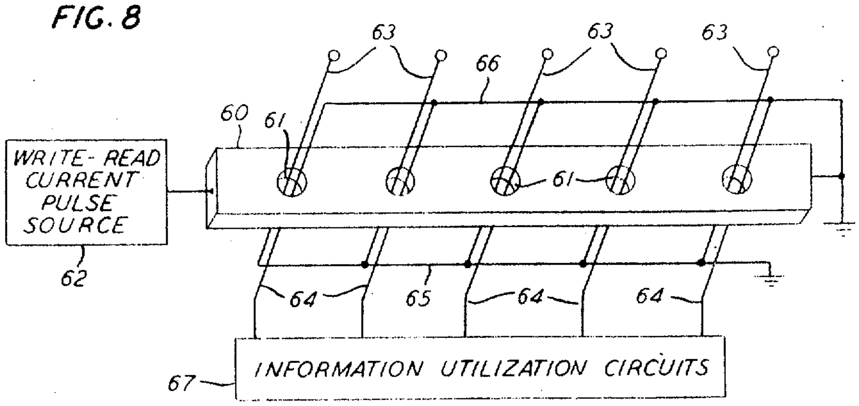
FIG. 8 depicts another illustrative multiaddress memory element according to this invention.

Another advantageous physical form of the embodiment of this invention shown in FIG. 5 is depicted in FIG. 8. An illustrative word organized memory element is there shown which has a representative storage capacity of 5 bits. This memory element comprises an electrical conductor 60, which may advantageously take the form of a flattened copper strip, which conductor has a plurality of apertures 61 at spaced intervals therein. The conductor 60 is plated, or has otherwise affixed thereto, over its entire surface, including the inner surfaces of the apertures 61, a magnetic film which is not specifically designated in the drawing. The conductor 60 is connected at one end to ground and at the other end to a write-read current pulse source 62. Each of the apertures 61 has threaded therethrough a write conductor 63 and a sensing conductor 64. The write conductors 63 are each connected at one end to a ground bus 65 and at the other have provided thereon terminals to which write current pulses to be described may be applied. Each of the sensing conductors 64 is connected at one to a ground bus 66 and at the other end to information utilization circuits 67. The pulse source 62 and the utilization circuits 67 may comprise circuits well known in the art as was mentioned in connection with the embodiments of FIGS. 1 and 5 in the foregoing. Accordingly, these circuits are also shown in block symbol form only.

The operation of the embodiment of FIG. 8 is identical to that described in connection with the embodiment of FIG. 5. Thus, simultaneously with the application of a write current pulse to the conductor 60, current pulses of particular polarities as determined by the binary bits to be stored in the memory element, are selectively applied to the digit write conductors 63. Helical magnetizations in particular senses are thus induced around apertures 61 in the branching portions of the bit addresses which magnetizations are representative of the binary bits to be stored. Reference may again be had to FIG. 7 for a specific portrayal of the manner in which the helical flux orientations are aligned for the storage of the 2 binary bits. A readout operation occurs in the same manner as that described for the embodiment of FIG. 5 with output signals of opposite polarity indicative of the binary bits being transmitted to the information utilization circuits 67.

Figure 9:
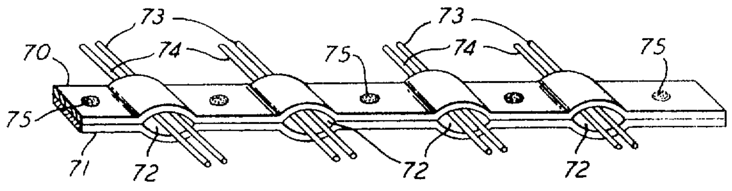
FIG. 9 illustrates one specific advantageous construction of a memory element according to this invention.
Figure 10:
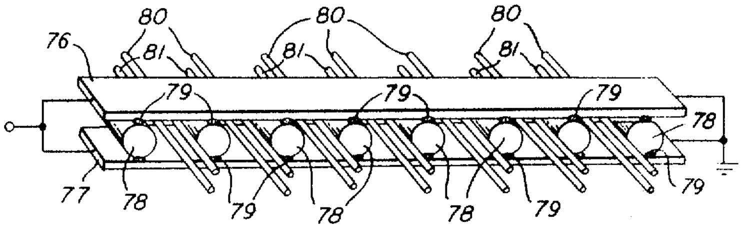
FIG. 10 illustrates an alternate advantageous construction of a memory element according to this invention.

FIGS. 9 and 10 depict the manner in which a magnetic memory element according to the principles of this invention advantageously lends itself to new and novel fabrication techniques. In FIG. 9 is shown a structure in which the conductor-memory element corresponding to the strip 60 of the embodiment of FIG. 8, for example, is fabricated to two flat strips 70 and 71 each being offset at intervals to provide a plurality of apertures 72 when placed back-to-back. Through the apertures 72 thus formed are passed pairs of write and sensing conductors 73 and 74. The flat strips 70 and 71 advantageously may be of an electrically conductive magnetic material having substantially rectangular hysteresis characteristics, or the strips may be simply electrical conductors having a magnetic film plated or otherwise affixed thereto after assembly. Assembly of the structure of FIG. 9 may be accomplished by arranging the write and sensing conductor pairs 73 and 74 in the recessed portions of the strip 71. After the upper strip 70 is arranged in place, the two strips may be formed into an integral structure by a suitable means well known in the art such as by the spot welds 75.

Another advantageously fabricated structure for achieving a memory element according to this invention is depicted in FIG. 10 and comprises a pair of flat strip conductors 76 and 77 which may also be of a magnetic material having substantially rectangular hysteresis characteristics or may have the latter material plated or otherwise affixed on all of the surfaces thereof. The strips 76 and 77 are maintained in a spaced relationship by a plurality of soft magnetic members 78 arranged at intervals therebetween. The elements thus arranged are formed into an integral structure also by any suitable means well known in the art, such as by the welds 79. Through the spaces presented by the strips 76 and 77 and the magnetic members 78 are passed a plurality of write and sensing conductor pairs 80 and 81. It will be apparent that the structures depicted in FIGS. 9 and 10 are the full structural equivalents of the memory element of FIGS. 5 and 8 and the operations of memory elements thus constructed are identical in every respect to the operations described in connection with the embodiments of the latter figures.

Figure 11:
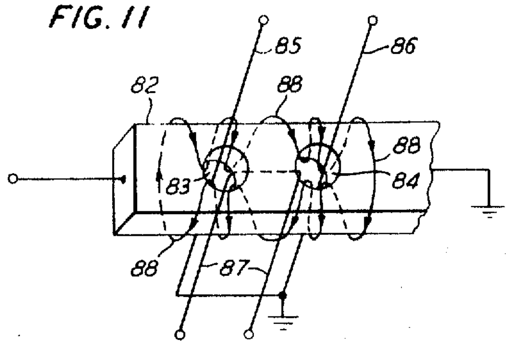
FIGS. 11 and 12 depict portions of the memory element shown in FIG. 8 relative to a manner for nondestructive readout of the memory element.
Figure 12:
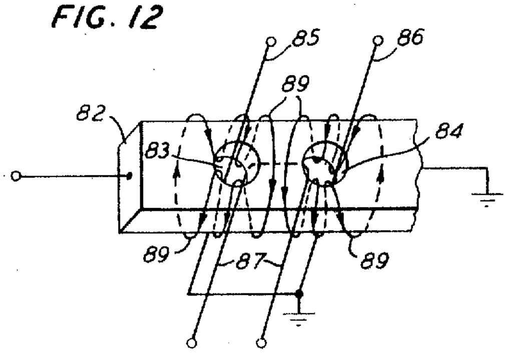

FIGS. 11 and 12 demonstrate an alternate manner of operating a memory element according to this invention for achieving nondestructive readout. This operation is depicted and will be described in connection with the illustrative structure shown in the embodiment of FIG. 8. The organization of the memory element for nondestructive readout in this alternate operation is on a two hole per bit basis. A portion 82 of the memory element of FIG. 8 is shown in each of FIGS. 11 and 12, which portion includes therein two apertures 83 and 84. The apertures 83 and 84 have write conductors 85 and 86, respectively, threaded therethrough and a sensing conductor 87 is inductively coupled to the portion of the structure 82 between the apertures 83 and 84. In order to introduce a binary "1" into the structure 82 so organized, a write current pulse is applied to the latter element itself simultaneously with the application of write current pulses of like polarity to the write conductors 85 and 86. Thus, referring now to FIG. 11, if a positive word write current pulse is applied to the terminal of the memory element 82 simultaneously with the application of positive digit write current pulses to the terminals of the write conductors 85 and 86, a flux orientation will result in the element 82 in the directions as represented by the lines and arrows 88. This orientation may be held representative of a binary "0." If, on the other hand, a binary "1" is to be stored in the element 82 so organized, a positive word write current pulse is applied to the terminal of the latter element while digit write current pulses of positive and negative polarity are simultaneously applied to the terminals of the write conductors 85 and 86, respectively. The resulting flux orientation and its directions are depicted in FIG. 12 by the lines and arrows 89.

The flux lines 88 and 89 in FIGS. 11 and 12, respectively, although shown as encircling the element 82, are to be understood as representing the magnetizations within the latter element. Thus, if the element 82 comprises a conductor having an outer layer of magnetic material affixed to each of its external faces, the magnetizations will helically encircle the conductor within the magnetic layers. It is evident from the drawing and in accordance with the positive polarity of the word write pulse, that the resultants of the latter pulse and each of the write current pulses will cause the near face of the element 82, as viewed in the drawing, to be magnetized substantially downward, also with reference to the drawing, for each binary value. In the bit storage as depicted in FIG. 11 both the near and the far face of the element 82 between the apertures 83 and 84 will be essentially unmagnetized. In the bit storage as depicted in FIG. 12, on the other hand, only the far side of this portion of the element 82 will remain unmagnetized. The near face of this portion in the latter storage, as is evident from the drawing, will be magnetically saturated in the downward direction. Since it is known that the permeability of demagnetized material is higher than that of the same material when magnetized, this fact may be advantageously employed to realize nondestructive readout of the binary bits so stored.

This nondestructive readout is accomplished by applying a positive read current pulse to the terminal of the element 82 alone. The read pulse is limited, however, to a magnitude such that the magnetomotive force generated thereby is less than the switching threshold of the magnetic layer of the element 82. Since the portion of the element 83 between the apertures 83 and 84 for the storage of a binary "0" is essentially unmagnetized, a reversible flux switching will occur therein which is, however, not sufficient permanently to change the information representative magnetic state. Thus flux change in addition is not in a direction to be coupled to the sensing conductor 87, as a result, no output voltage signal is induced in the latter conductor and the absence of such an output signal is accordingly indicative of the presence in the storage address of a binary "0." In the case of the storage of a binary "1," on the other hand, the nondestructive read pulse will cause relatively little flux change in the front face of the portion of the element 82 between the apertures 83 and 84 since this face is already remanently saturated in the direction in which the read pulse tends to drive it. However, the read pulse will cause a flux switching up the rear face of the address portion of the element 82 between the apertures 83 and 84. This flux switching will close in the element 82 on the portions thereof outside of the apertures 83 and 84 on the front face. This flux switching through these higher permeability paths is coupled to the sensing conductor 87 and accordingly the information representative state will be manifested by the induction in the sensing conductor 87 as a voltage output signal and hence, the presence in the storage address of a binary "1." As in the case of the readout of a binary "0," any flux changes occurring during the latter readout will be below the switching threshold of the element 82 and accordingly will be only temporary.

Obviously, the foregoing readout may also be destructive. When a read current pulse of a polarity opposite, and of a magnitude equal to the word write pulse is applied to the element 82, the stored information may be cleared from the element, the polarities of the output signals indicating the bits which were stored.

Figure 13:
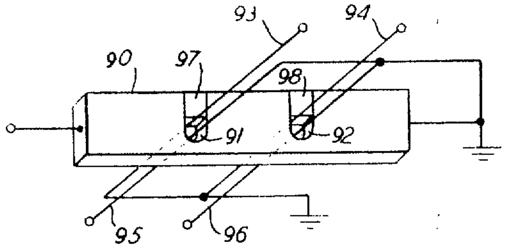
FIG. 13 depicts another illustrative embodiment of a memory element according to this invention organized in a manner similar to the embodiment of FIG. 8.

A specific embodiment of this invention depicted in FIG. 13 operates in a manner identical to the operation described in connection with the embodiment shown in FIG. 8. The memory element of FIG. 13, shown only as a single two address element, also comprises a flat strip conductor 90 which may be a solid of an electrically conducting magnetic material having substantially rectangular hysteresis characteristics or the element 90 may comprise a copper conductor having a magnetic layer covering each of its surfaces. The strip element 90 has a pair of slots 91 and 92 formed therein, through which slots are threaded digit write conductors 93 and 94 and sensing conductors 95 and 96, respectively. Inserted in the slots 91 and 92 and in inductive coupling with each surface of each of the latter slots, are a pair of plugs 97 and 98, respectively. The latter plugs, which are of a high permeability, electrically insulating, magnetic material, are inserted in their respective slots only so far as to leave sufficient apertures for the digit write and sensing conductors. This mode of construction of the element of FIG. 8 advantageously permits a reduction in the magnitude of the word write pulse. Because of the insertion of the insulating plugs in the slots 91 and 92, the word current pulse no longer divides, one of the branch conducting paths of a bit address being electrically opened. However, the element 90 still presents branch paths for flux closure therethrough at each bit address. Accordingly, the flux orientations during various operative phases of the element 90 will be substantially similar to those described in connection with the embodiments of FIGS. 5 and 8.

Figure 14:
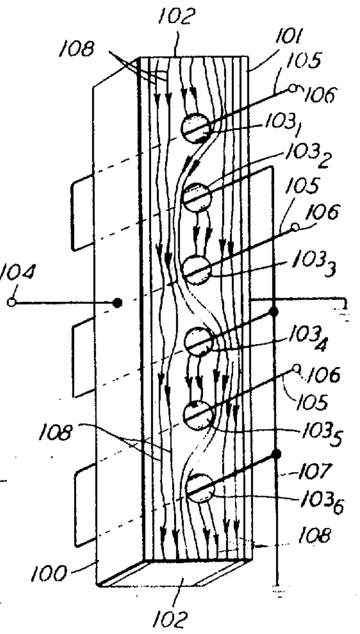
FIG. 14 depicts another illustrative embodiment of a memory element according to the principles of this invention.

Another illustrative memory element according to the principles of this invention is shown in FIG. 14 and comprises a pair of flat, electrically conductive plates 100 and 101 having affixed therebetween, for the entire lengths of the latter plates, a magnetic member 102. The latter member is fabricated of an electrically conductive magnetic material having substantially rectangular hysteresis characteristics and has a plurality of spaced apertures 103 therein having their central axes parallel to the inner faces of the plates 100 and 101. The plate 100 is connected on it s outer face to a terminal 107 and the plate 101 is connected at its outer face to ground. The apertures 103 are associated by pairs by a plurality of digit write-sense conductors 105. The latter conductors, each having a terminal 106 at one end, each pass in one direction through one aperture 103 and return through the adjacent aperture 103 in the opposite direction and terminate at the other end in a ground bus 107.

The operation of the illustrative memory element of FIG. 14 is also based on the principles of this invention, that is, the cooperation of a word current dividing between parallel branch paths presented in the memory element and digit write currents applied to conductors passing between the branch paths. The flux orientations established between the apertures 103 in the magnetic member 102 by the resultants of these write currents represent the binary bits stored in the memory element. As is apparent from the foregoing the memory element of FIG. 14 is also word-organized, the illustrative 3 bit address being determined as the portions of the member 102 defined between the aperture pairs $\mathbf{103_1}$—$\mathbf{103_2}$, $\mathbf{103_3}$—$_{\mathbf{1034}}$, and $\mathbf{103_5}$—$\mathbf{103_6}$. In describing an illustrative cycle of operation, it will be assumed that the binary work 1, 0, 1 is to be stored. To accomplish this storage during a write phase, a positive word write current pulse is applied to the terminal 104. Since the plates 100 and 101 are of the same potential along their entire lengths, the word write pulse will traverse the conductive member 102 therebetween through each of the branch conducting paths formed by the apertures 103. The magnetic field generated by the word write pulse will tend to induce magnetizations in the member 102 which are downward in the area of its near face as viewed in the drawing and upward in the area of its far face, both in the portions between the apertures 103 and the plates 100 and 101 and in the portions between the apertures 103 themselves.

Coincidentally with the application of the word write current pulse, digit write current pulses for selectively magnetizing the member 102 in accordance with the assumed input information are applied to the terminals 106 of the digit write conductors 105. In accordance with this information, positive write current pulses are applied to the write conductors 105 threading the aperture pairs $\mathbf{103_1}$—$\mathbf{103_2}$ and $\mathbf{103_5}$—$\mathbf{103_6}$. Similarly a negative write current pulse is applied to the write conductor 105 threading the aperture pairs $\mathbf{103_3}$—$\mathbf{103_4}$. The fields generated by the latter pulses will tend to magnetize the areas around the apertures 103 as follows: clockwise around the apertures $\mathbf{103_1}$, $\mathbf{103_4}$, and $\mathbf{103_5}$ and counterclockwise around the apertures $\mathbf{103_2}$, $\mathbf{103_3}$, and $\mathbf{103_6}$. The magnetizations induced in the member 102 by the resultants of the word field and each of the digit fields are schematically represented in FIG. 14 by the flux lines 108, the direction being indicated by the arrows. The representation of the magnetizations in FIG. 14 are shown with respect to the near face of the member 102 only for purposes of simplicity, and it is to be understood that the magnetizations exist within the structure 102 such that the flux lines 108 encircle the member 102 around the axis presented by the conductor terminal 104. Accordingly, the far face of the member 102 is magnetized in a manner similar to that depicted in FIG. 14 for the near face except that the directions and the slopes of the magnetizations are reversed.

An inspection of the flux lines 108 of FIG. 14 shows that the magnetizations in the bit address area between the apertures $\mathbf{103_1}$—$\mathbf{103_2}$ and $\mathbf{103_5}$—$\mathbf{103_6}$ slope from upper right to lower left as viewed in the drawing and the magnetizations in the bit address area between the apertures $\mathbf{103_3}$—$\mathbf{103_4}$ slope from upper left to lower right. These magnetizations and their slopes represent in the memory element of FIG. 14 the exemplary binary bits 1, 0, 1 assumed to be stored therein. During a subsequent readout phase of operation, a negative read current pulse is applied to the terminal 104 alone. The magnetic fields generated by the latter pulse encircle the axis of the conductor-terminal 104 in the upward direction with respect to the near face of the memory member 102. The resulting flux switchings in the portions of the latter members between the apertures 103 comprising the bit storage addresses will induce output voltage signals in the write conductors 105 which may now advantageously serve an output function. Specifically, since the magnetic states from which the bit address portions between the apertures $\mathbf{103_1}$ and $\mathbf{103_2}$ and between the apertures $\mathbf{103_5}$ and $\mathbf{103_6}$ are switched are the same, and since the latter states are different from the magnetic state from which the bit address portion between the apertures $\mathbf{103_4}$ and $\mathbf{103_5}$ is switched, the opposite polarities of the output signals generated as the result of the flux switching in these bit addresses will indicate the presence in these bit addresses of the stored exemplary binary word. Since the read current pulse switches all of the magnetizations in the member 102 to directions which are orthogonal to the axis of the conductor-terminal 104, the memory element is also cleared of information and is in a condition for the restoration of the information readout or for the introduction of a new binary work.

Figure 15:
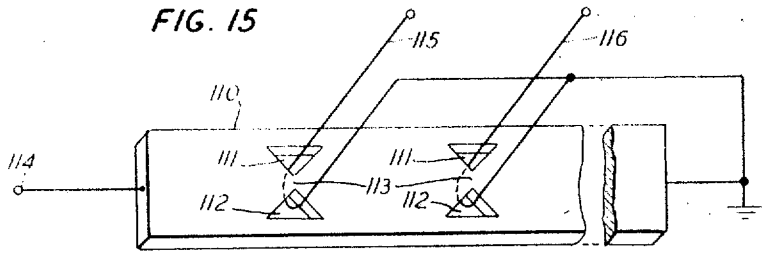
FIG. 15 shows a portion of still another specific embodiment of this invention achieving a reduction in word drive currents.

In FIG. 15 is depicted another illustrative embodiment of this invention, the specific organization of which advantageously permits a substantial reduction in the word current. A single word, 2 bit address is specifically shown and comprises a flat strip electrical conductor 110 which may also be a solid conductor of magnetic material having substantially rectangular hysteresis characteristics or the conductor 110 may have the latter magnetic material plated, or otherwise affixed, to all of its surfaces. The conductor 110 has formed therein, at spaced apart intervals, pairs of substantially triangular apertures 111 and 112. The bit addresses of the memory element of FIG. 15 are defined by the aperture pairs 111 and 112 and comprise the portions 113 of the conductor 110 between the vertices of the triangles formed by the individual apertures of each aperture pair and between the bases of these triangles and the longitudinal edges of the conductor 110. The conductor 110 is connected at one end to a terminal 114 and at its other end to ground. The portions 113 of the conductor 110 have coupled thereto write-sensing conductors 115 and 116, one end of each of which is connected to ground. Although only 2 bit addresses are shown in the simplified embodiment of FIG. 15, it is to be understood that the conductor 15 may be extended to include a large number of such addresses and this element is accordingly shown as broken for purposes of illustration.

Figure 16:
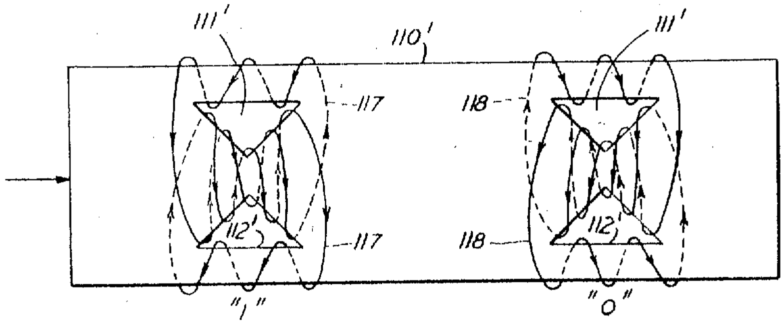
FIG. 16 depicts the flux orientations during various information states of the embodiment of this invention depicted in FIG. 15.

The apertures 111 and 112 at each bit address location on the conductor 110 divide the latter conductor into three separate branch conducting paths between the terminal 114 and the next succeeding such branch paths. Accordingly, any current applied to the terminal 114 will divide among these branch paths as determined by the resistances presented by these paths. From the specific geometry of the portions of the conductor 110 formed by the triangular apertures 111 and 112 comprising the branch conducting paths, it will be apparent that the largest percentage of any current applied to the terminal 114 will be conducted through the central path formed by the opposing vertices of the triangular apertures. This fact is advantageously employed to realize in the conductor 110 the flux orientations representing the binary bits stored in the element. These flux orientations will be best understood from a consideration of an illustrative cycle of operation of the memory element of FIG. 15 with particular reference to the flux diagram depicted in FIG. 16. For purposes of illustration, it will be assumed that the bit address served by the write-sense conductor 115 is to contain a binary "1" and that the bit address served by the write-sense conductor 116 is to contain a binary "0." In order to accomplish this write operation, a positive word write current pulse is applied to the terminal 114. This current pulse is represented as applied at the left-hand side of the element 110' of FIG. 16 as indicated by the arrow. This word write current pulse, in being conducted along the conductor 110 divides at the three branch paths presented at each bit address portion of the latter element, with the larger percentage of the current, as mentioned previously, being present in the portion between the vertices of the triangular apertures 111 and 112. Viewing the conductor 110 of FIG. 15 only with respect to its near face depicted in FIG. 16, the field generated by the word write current pulse in the conductor 110 about the axis of the terminal 114 and the axes of the branch conducting paths, it will be apparent that the magnetizations induced in the branch paths by the word write pulse alone will be downward in the near face. This will be the case at both of the bit address locations.

Simultaneously with the application of the word write current pulse applied to the terminal 114, a positive and a negative digit write current pulse are applied to the write-sensing conductors 115 and 116, respectively. The effects of the fields produced by the latter current pulses will be to move the downward magnetizations induced by the word write current pulse to right- and left-hand helical directions in the central legs of the bit addresses which are to contain a binary "1" and "0," respectively. The flux orientations thus resulting are graphically depicted in FIG. 16 by representational flux lines 117 and 118, respectively, shown for convenience as encircling the structure of the branch paths of the conductor 110'. It is apparent from an inspection of FIG. 16 that the greatest concentration of flux is in the bit address portions of the conductor 110' between the vertices of the triangular apertures 111' and 112'. With the termination of the word and digit write current pulses, the illustrative binary bits are stored in the memory element. A readout operation is initiated by applying a negative read current pulse to the terminal 114 alone. The field generated by the latter current pulse switches the flux at each of the bit addresses to an upward direction, viewing only the near face of the element 110' as presented in FIG. 16. Clearly, the magnetic states from which these flux switchings take place are opposite for the 2 binary bits. As a result, output voltage signals induced in the sensing conductors 115 and 116 will also be opposite in polarity thus indicating the readout of the two bits assumed to be stored in the element in a conventional manner. Since the only flux distribution that is of importance in the memory element of FIG. 15 exists in the portion between the apertures 111 and 112 at each bit location, the word write current pulse need only be of sufficient amplitude to induce the required information representative flux states at these points. The digit write current pulses are maintained at an amplitude insufficient to drive the magnetic material of the conductor 110 beyond its switching threshold in order to achieve selectivity among corresponding bit addresses on adjoining word memory elements in a coordinate array organization.

Each of the specific illustrative embodiments of this invention described in the foregoing may be adapted for use as one of a plurality of memory elements organized as a coordinate array memory. Such arrangements presenting a coordinate array having a magnetic storage element at each of its crosspoints are well known in the art and accordingly need not be described in detail for an understanding thereof. However, each of the embodiments described in the foregoing has been assumed to be organized on a word basis in contemplation of its use in such coordinate array memories. In each case, during the write operation, the word write current pulse serves as one of the coincident currents for each of the bit addresses. During the readout operation, a single read current pulse serves to read out in the information in each of the bit addresses simultaneously. It is to be understood, however, that any of the illustrative memory elements according to this invention described in the foregoing may be employed as a single discrete magnetic switching element having its own individual drive currents assigned thereto. Memory elements according to this invention may thus be employed in any of the varied and numerous circuit applications in which conventional prior art magnetic elements have previously been employed.

Accordingly, it is to be understood that what have been described are considered to be only illustrative embodiments of this invention and that various and numerous other arrangements may be devised by one skilled in the art without departing from the spirit and scope of this invention as defined by the accompanying claims.

We claim:

1. A magnetic memory device comprising an elongated magnetic structure having a longitudinal axis and being of a material having substantially rectangular hysteresis characteristics, said structure having open ends and forming a primary flux leg, said structure further having an aperture therein transverse to said axis to divide said structure between said ends into a first and a second parallel secondary flux leg defining a magnetically uninterrupted flux path around said aperture; and means for inducing an information representative remanent flux state around said aperture in said first and second secondary flux legs comprising means for applying a first magnetic field to said structure in one direction around said primary flux leg and in the same one direction around at least one of said secondary flux legs, said means for applying said first magnetic field comprises an electrical conducting means structurally congruent with said magnetic structure and in inductive coupling with said last-mentioned structure, and means including a conductor threading said aperture for applying coincidentally with said first field a second magnetic field to said structure circularly around said uninterrupted flux path in opposite directions along said first and second secondary flux legs.

2. A magnetic memory device comprising electrical conducting means having at least one aperture therein to form a pair of parallel branch conducting paths having a common electrical input point and a common electrical output point, said conducting means having magnetic material exhibiting substantially rectangular hysteresis characteristics affixed to at least the pair of branch conducting paths thereof, a write conductor threading said aperture, and means for coincidentally applying write current pulses to one end of said conducting means and thereby to said input point and to said write conducting paths.

3. A magnetic memory device as claimed in claim 2 also comprising a readout means for subsequently applying a read current pulse to said electrical conducting means and thereby to said common electrical input point and means for detecting flux changes in said magnetic material around said branch conducting paths.

4. A magnetic memory device comprising electrical conducting means having at least one aperture therein to form a pair of parallel branch conducting paths having a common electrical input point and a common electrical output point, and conducting means having magnetic material exhibiting substantially rectangular hysteresis characteristics affixed to one surface of at least the pair of branch conducting paths thereof to form a closed flux path therearound, said magnetic material having an anisotropy established therein around said closed flux path, and means for inducing particular remanent magnetizations in said closed flux path comprising means for applying a first write current pulse to said electrical conducting means for generating a magnetic field around each branch of said pair of parallel branch conducting paths, a write conductor threading said aperture, and means for applying a second write current pulse to said write conductor coincidentally with said first write current pulse for generating a magnetic field in the direction of said anisotropy.

5. A magnetic memory device as claimed in claim 4 also comprising readout means comprising means for subsequently applying a read current pulse to said electrical conducting means and thereby to said common electrical input point for again generating a magnetic field around each branch of said pair of parallel branch conducting paths for changing the alignment of said remanent magnetization in said closed flux path and means for detecting magnetization changes in said closed flux path.

6. A magnetic memory device comprising electrical conducting means having at least one aperture therein to form a pair of parallel branch conducting paths having a common electrical input point and a common electrical output point, said conducting means having magnetic material exhibiting substantially rectangular hysteresis characteristics affixed to each surface of at least the pair of branch conducting paths thereof to form a closed uninterrupted flux path therearound, and means for inducing helical remanent magnetizations around said branch conducting paths in said closed flux path in senses representative of binary values comprising means for applying a first write current pulse to said electrical conducting means for generating around each branch of said branch conducting paths magnetic field, a write conductor threading said aperture, and means for applying a second write current pulse to said write conductor coincidentally with said first write current pulse for generating a magnetic field along said branch conducting paths in opposite directions and around said closed flux path.

7. A magnetic memory device as claimed in claim 6 also comprising readout means comprising means for subsequently applying a read current pulse to said electrical conducting means for again generating a magnetic field around each branch of said branch conducting paths for changing the alignment of said remanent magnetizations in said closed flux path and means for detecting magnetization changes in said closed flux path.

8. A magnetic memory device comprising electrically conducting strip means having a plurality of apertures therein to form a plurality of pairs of parallel branch conducting paths, each of said pairs of conducting paths having common electrical input and common electrical output points, said conducting strip means having magnetic material exhibiting substantially rectangular hysteresis characteristics affixed to at least said pairs of branch conducting paths thereof, a plurality of write conductors threading respectively said plurality of apertures, means for applying a first write current pulse to one end of said conducting strip means, and means for selectively applying second write current pulses of predetermined polarity to said plurality of write conductors coincidentally with said first write current pulse, said first and second write current pulses inducing helical remanent magnetizations in said magnetic material around said apertures in directions in accordance with said predetermined polarities of said second write current pulses representative of stored binary values.

9. A magnetic memory device comprising electrically conducting strip means having a slot extending from one edge therein, said conducting strip means having magnetic material exhibiting substantially rectangular hysteresis characteristics affixed to each surface thereof at least at portions thereof on each side of said slot, a magnetic electrically nonconducting member inserted in said slot in a manner to present a closed flux path around an aperture in said conducting strip, a write conductor threading said aperture, and means for coincidentally applying write current pulses to one end of said conducting strip and to said write conductor for inducing a particular remanent magnetization in said closed flux path around said aperture.

10. A magnetic memory device comprising electrically conducting strip means having a pair of apertures therein, said apertures being arranged to present a branch conducting path at each edge of said strip means and a central branch conducting path between said apertures, said apertures being further formed such that the resistance of said central branch conducting path is less than the resistance of either of said branch conducting paths at edges of said strip means, said conducting strip means having magnetic material exhibiting substantially rectangular hysteresis characteristics affixed to each surface thereof at least at portions thereof surrounding said apertures, winding coupled to the magnetic material affixed to the surfaces of said central branch conducting path, and means for coincidentally applying write current pulses to one end of said conducting strip means and to said winding for inducing particular remanent magnetizations in said magnetic material surrounding said apertures.

11. A magnetic memory device comprising an electrically conducting strip having a pair of apertures therein, each of said apertures being in the form of a triangle having its base substantially parallel to, and forming a branch conducting path with, an opposite edge of said strip, the vertices of said triangles defining a central branch conducting path in said strip, said conducting strip having magnetic material exhibiting substantially rectangular hysteresis characteristics affixed to each surface thereof at least at portions thereof surrounding said apertures, and means for inducing helical remanent magnetizations around said central branch conducting path in said magnetic material in senses representative of binary values comprising means for applying a first write current pulse to said strip for generating a magnetic field around said strip and around each of said branch conducting paths, a winding coupled to said central branch conducting path, and means for applying a second write current pulse to said winding coincidentally with said first write current pulse for generating a magnetic field along said central branch conducting path.

12. A magnetic structure comprising an electrically conducting flat strip having a plurality of pairs of apertures therein, the apertures of each of said pairs of apertures being arranged in a line substantially transversely to a longitudinal axis of said strip, each of the apertures of each of said pairs of apertures further being in the form of a triangle having its base substantially parallel to, and forming a branch conducting path with, an opposite edge of said strip, the vertices of the triangles of each of said pairs of apertures defining a central branch conducting path in said strip, said strip having a magnetic material having substantially rectangular hysteresis characteristics affixed to each surface thereof at least at portions thereof surrounding said pairs of apertures.

13. A magnetic memory device comprising electrically conducting strip means having a plurality of apertures therein, each of said apertures forming a pair of parallel branch conducting paths in said strip means, each of said pairs of parallel branch conducting paths having a common electrical input point and a common electrical output point, said strip means having magnetic material having substantially rectangular hysteresis characteristics affixed to each surface thereof at least at portions thereof on each side of said apertures, a pair of write conductors threading a first and a second of said apertures, respectively, and means for inducing particular magnetizations in an address portion of said strip between said first and second apertures comprising means for applying a first write current pulse to said conducting strip means for generating a magnetic field around said strip means and around said branch conducting paths, and means for applying second write current pulses to said pair of write conductors coincidentally with said first write current pulse for generating magnetic fields circularly around said first and second apertures.

14. A magnetic memory device as claimed in claim 13 also comprising readout means comprising means for subsequently applying a read current pulse to said conducting strip alone for again generating a magnetic field around said strip means and around branch conducting paths, said read current pulse being limited in magnitude such that said last-mentioned magnetic field in insufficient to exceed the switching threshold of said magnetic material, and a readout winding coupled to said address portion of said strip means.

15. A magnetic memory device comprising an elongated magnetic member of an electrically conducting magnetic material having substantially rectangular hysteresis characteristics, said member having a plurality of apertures therein at spaced apart intervals along a longitudinal axis thereof, a pair of electrically conducting strip elements disposed in electrical contact along opposite sides of said magnetic member parallel to said longitudinal axis, and means for including particular magnetizations in an address portion of said magnetic member defined between an adjacent first and second aperture of said plurality of apertures comprising circuit means including said pair of electrically conducting strip elements for applying a first write current pulse to said magnetic member for generating a magnetic field in the direction of said longitudinal axis in said address portion of said magnetic member, a winding coupled through said first and second apertures to said address portion of said magnetic member, and means for applying a second write current pulse to a polarity in accordance with input information to said winding coincidentally with said first write current pulse for generating magnetic fields circularly around said first and second apertures.

16. A magnetic memory device as claimed in claim 15 in which said circuit means also comprises means for applying a read current pulse to said magnetic member.

17. A magnetic memory device comprising an elongated magnetic member of an electrically conducting material having substantially rectangular hysteresis characteristics, said member having opposing surfaces and a plurality of apertures therein at spaced apart intervals parallel to said opposing surfaces, a pair of electrically conducting strip elements each having an electrical terminal, said strip elements being in electrical contact with said opposing surfaces, respectively, said elongated magnetic member completing an electrical circuit between said pair of strip elements, a word write circuit including said pair of conducting strip elements, and a plurality of digit write circuits each including a winding coupled to an address portion of said magnetic member defined therein between adjacent apertures of said plurality of apertures.

18. A magnetic memory construction comprising a pair of flat strip conductors each having equally spaced apart offsets formed therein, said strip having transverse to a longitudinal dimension thereof a cross section having a width which is much greater than its thickness, said offsets extending from the longitudinal direction of the strip in the direction of said thickness, said strip conductors being affixed in electrical contact in a back-to-back relationship having said offsets in registration to present a plurality of apertures between said pair of strip conductors, each of said strips having magnetic material exhibiting substantially rectangular hysteresis characteristics affixed to each exposed surface thereof at least at portions thereof surrounding said apertures, and electrical conducting means threading said apertures.

19. A magnetic memory construction comprising a pair of flat strip conductors parallelly arranged in a spaced apart relationship, each of said strips having magnetic material exhibiting substantially rectangular hysteresis characteristics affixed to each exposed surface thereof, a plurality of magnetic members affixed at spaced apart intervals between said strip conductors, said magnetic members providing a closed and uninterrupted flux path between the magnetic material of each of said strips and providing completed electrical circuits between each of said strips, and a plurality of conducting means threading between said strip conductors and said plurality of magnetic members, respectively.

20. An electrical memory circuit comprising an electrical strip conducting means having a plurality of spaced apart apertures therein to form a plurality of pairs of branch conducting paths, each of said pairs of branch conducting paths having a common electrical input point and a common electrical output point, said strip conducting means having magnetic material exhibiting substantially rectangular hysteresis characteristics affixed to each surface thereof at least at portions thereof including said plurality of first and second branch conducting paths, and means for selectively inducing information representative remanent flux states around said apertures in said magnetic material in particular directions in accordance with said information comprising means for applying a first write current pulse to one end of said strip conducting means, a plurality of write conductors threading respectively said plurality of apertures, and means for selectively applying second write current pulses of particular polarities to said plurality of write conductors coincidentally with said first write current pulse.

21. An electrical memory circuit as claimed in claim 20 also comprising readout means comprising means for subsequently applying a read current pulse to said one end of said strip conducting means and detecting means for detecting flux changes in said magnetic material around said apertures.

22. An electrical memory circuit as claimed in claim 21 in which said detecting means comprises a plurality of sensing conductors also threading respectively said plurality of apertures.

23. A magnetic memory device comprising an elongated magnetic structure having a longitudinal axis and being of a material having substantially rectangular hysteresis characteristics, said structure having open ends and forming a primary flux leg, said structure further having an aperture therein transverse to said axis to divide said structure between said ends into a first and a second parallel secondary flux leg defining a magnetically uninterrupted flux path around said aperture, said structure having a circular anisotropy induced therein around said first and second secondary flux legs, and means for inducing an information representative remanent flux state around said aperture in said first and second secondary flux legs comprising means for applying a first magnetic field to said structure in one direction around said primary flux leg and in the same one direction around at least one of said secondary flux legs, and means including a conductor threading said aperture for applying coincidentally with said first field a second magnetic field to said structure circularly around said uninterrupted flux path in opposite directions along said first and second secondary flux legs.

24. A magnetic memory device comprising an elongated magnetic structure having a longitudinal axis and being of a material having substantially rectangular hysteresis characteristics, said structure having open ends and forming a primary flux leg, said structure further having an aperture therein transverse to said axis to divide said structure between said ends into a first and a second parallel secondary flux leg defining a magnetically uninterrupted flux path around said aperture, and means for inducing an information representative remanent flux state around said aperture in said first and second secondary flux legs comprising means for applying a first magnetic field to said structure in one direction around said primary flux leg and in the same one direction around at least one of said secondary flux legs, said means for applying said first magnetic field comprises an electrical conductor means structurally congruent with said magnetic structure and in inductive coupling with the last-mentioned structure, said magnetic structure comprising a magnetic film affixed to one surface of one of said conducting means, and means including a conductor threading said aperture for applying coincidentally with said first field a second magnetic field to said structure circularly around said uninterrupted flux path in opposite directions along said first and second secondary flux legs.

25. A magnetic memory device comprising an elongated magnetic structure having a longitudinal axis and being of a material having substantially rectangular hysteresis characteristics, said structure having open ends and forming a primary flux leg, said structure further having an aperture therein transverse to said axis to divide said structure between said ends into a first and a second parallel secondary flux leg defining a magnetically uninterrupted flux path around said aperture; and means for inducing an information representative remanent flux state around said aperture in said first and second secondary flux legs comprising means for applying a first magnetic field to said structure in one direction around said primary flux leg and in the same one direction around at least one of said secondary flux legs, said means for applying said first magnetic field comprises an electrical conducting means structurally congruent with said magnetic structure and in inductive coupling with the last-mentioned structure, said magnetic structure comprising a magnetic film affixed to each surface of said conducting means, and means including a conductor threading said aperture for applying coincidentally with said first field a second magnetic field to said structure circularly around said uninterrupted flux path in opposite directions along said first and second secondary flux legs.

26. A magnetic memory device comprising an elongated magnetic structure of a material having substantially rectangular hysteresis characteristics, said structure forming a main flux leg and having a plurality of apertures therein to divide said structure into a plurality of first and second parallel secondary flux legs defining a plurality of first and second magnetically uninterrupted flux paths therearound, said structure having a circular anisotropy induced therein around each of said plurality of first and second flux paths, and means for selectively inducing information representative remanent flux states around said apertures in particular directions in said first and second flux paths comprising means for applying a first magnetic field to said structure around said main flux legs and around said first and second secondary flux legs, and means including a plurality of conductors threading said plurality of apertures, respectively, for applying coincidentally with said first field, second magnetic fields to said structure circularly around said first and second flux paths, said second magnetic fields having directions in accordance with said information.

27. A magnetic memory device comprising an elongated magnetic structure of a material having substantially rectangular hysteresis characteristics, said structure forming a main flux leg and having a plurality of apertures therein to divide said structure into a plurality of first and second parallel secondary flux legs defining a plurality of first and second magnetically uninterrupted flux paths therearound, and means for selectively inducing information representative remanent flux states around said apertures in particular directions in said first and second flux paths comprising means for applying a first magnetic field to said structure around said main flux leg and around said first and second secondary flux legs, said means for applying said first magnetic field comprises an electrical conducting means structurally congruent with said magnetic structure and in inductive coupling with the last-mentioned structure, and means including a plurality of conductors threading said plurality of apertures, respectively, for applying coincidentally with said first field, second magnetic fields to said structure circularly around said first and second flux paths, said second magnetic fields having directions in accordance with said information.

28. A magnetic memory device as claimed in claim 27 in which said magnetic structure comprises a magnetic film affixed to one surface of said conducting means.

29. A magnetic memory device as claimed in claim 27 in which said magnetic structure comprises a magnetic film affixed to each surface of said conducting means at least at portions thereof including said plurality of first and second flux paths.

30. A magnetic memory element comprising a magnetic structure presenting a closed, uninterrupted flux loop around an aperture therein said structure having a circular axis around said flux loop, said structure being of a material having substantially rectangular hysteresis characteristics; means for introducing information representative flux states around said flux loop in said structure comprising first write means for applying first magnetic fields to said structure orthogonal to said circular axis of said structure around said closed flux loop, said first write means comprises conducting means inductively coupled to said structure, said conducting means being physically congruent to said structure, said conducting means having an input at one point on said closed flux loop and an output at a different point on said closed flux loop, and a first energizing circuit including a pulse source, the last-mentioned circuit including said input and said output of said conducting means; and second write means for applying a second magnetic field to said structure in a direction along said circular axis coincidentally with said first magnetic fields.

31. A magnetic memory element as claimed in claim 30 in which said magnetic structure has a circular anisotropy induced therein around said closed flux loop.

32. A magnetic memory element as claimed in claim 30 in which said second write means comprises a conductor threading said structure through said aperture.

33. A storage element comprising a plurality of apertured, electrically conductive bit storage portions joined together by intervening electrically conductive portions to form an elongated conducting member, means passing a current along the conducting member so that such current divides at each bit storage portion to pass on both sides of the aperture therein, and said bit storage portions being coated with an anisotropic magnetic film.

34. A storage element comprising a plurality of apertured, toroidal, electrically conductive, bit storage portions joined together by intervening electrically conductive portions to form an elongated conducting member, means passing a current along the conducting member so that such current divides at each bit storage portion to pass on both sides of the aperture therein, and said bit storage portions being coated with an anisotropic magnetic film.

35. A storage element comprising a plurality of apertured, toroidal, electrically conductive, bit storage portions having the axes of said toroidal portions parallel to one another, said toroidal portions being joined together by intervening electrically conductive portions to form an elongated conducting member, means passing a current along the conducting member so that such current divides at each bit storage portion to pass on both sides of the aperture therein, and said bit storage portions being coated with an anisotropic magnetic film.

36. Magnetic memory apparatus comprising a conductive magnetic strip having at least one aperture therein and forming a storage device at the aperture, a source of unipolar current connected to the strip, a conductive winding positioned within the aperture, and a source of direct current connected to the winding and including means to actuate such source solely upon the concurrence of at least a portion of the current from the unipolar source to establish a polarized remanent magnetic flux state within the storage device.

37. A magnetic memory device comprising:

a. a plurality of nonmagnetic conductive strips of configurations including at intervals certain areas each defining a central aperture;

b. a coating of magnetic material covering all surfaces of said areas defining central apertures, whereupon each said area is definable as a bit storage area;

c. means for producing an electrical drive current, connected at a first position along the length of a selected one of said plurality of nonmagnetic conductive strips;

d. bit-sense conductor means passing through the central apertures of said bit storage areas; and e. means connected to said bit-sense conductor means to provide selective bit drive currents and to sense output signals.

38. A chain memory, comprising an electrically conductive strip having at least one aperture therein and having magnetic material deposited around the aperture and including an area of the strip contiguous to the aperture having a greater amount of magnetic material deposited thereon than the remaining area.

39. The memory of claim 38 wherein the area of the strip contiguous to the aperture includes branching and elongated areas, the branching area of the chain having the greater amount of material than the elongated area.

40. A chain memory, comprising a conductive strip having at least one aperture therein, and a magnetic material deposited on the entire surface of the conductive strip around the aperture to form a storage device, said storage device comprising elongated straight portions and branching portions.

41. A system comprising a plurality of elongated members each made of magnetic remanent material, said elongated members contacting each other to form an aperture defining a closed magnetic path passing through each of said members, a plurality of controllable electrical conductors disposed in different ones of said elongated members along the longitudinal axis thereof, an additional electrical conductor disposed within said aperture, means including said electrical conductors for varying the magnetization in said members, and means for detecting the magnetization in said members.

42. A circuit for coupling a drive conductor to an output circuit, said coupling circuit comprising a controllable coupling device having a first winding, a second winding, and electrically conductive magnetic circuit means coupled to said first and second windings, means connecting said drive conductor to said first winding, means connecting said second winding to said output circuit, a source of electric current control pulses, a source of data signal pulses coupled to said drive conductor, and means applying said current control pulses to said circuit means so that only one polarity, independent of data signal pulse polarity, of current control pulse occurs in said device during any one data signal pulse to thereby control coupling between said drive conductor and said output circuit.

43. A coupling circuit in accordance with claim 42 in which said coupling device comprises an apertured strip of conductive material coated with a thin layer of magnetic material whereby said control pulses each cause a temporary orientation of said magnetic material, said first and second windings extend through an aperture in said strip, and said device with said orientation provides a low impedance connection for signals between said first and second windings.

44. A coupling circuit in accordance with claim 42 in which said coupling device comprises an apertured strip of conductive material including said control connection and coated with a thin layer of magnetic material, and said first and second windings extend through an aperture in said strip.